(12) United States Patent
Aikawa et al.

(10) Patent No.: US 9,810,252 B2
(45) Date of Patent: Nov. 7, 2017

(54) LOWER MEMBER FIXING DEVICE AND FLUID CONTROL DEVICE PROVIDED WITH THE SAME

(71) Applicant: FUJIKIN INCORPORATED, Osaka-shi (JP)

(72) Inventors: Kenji Aikawa, Osaka (JP); Takahiro Matsuda, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 7 days.

(21) Appl. No.: 14/898,839

(22) PCT Filed: Nov. 12, 2014

(86) PCT No.: PCT/JP2014/079955
§ 371 (c)(1),
(2) Date: Dec. 16, 2015

(87) PCT Pub. No.: WO2015/098332
PCT Pub. Date: Jul. 2, 2015

(65) Prior Publication Data
US 2016/0138630 A1   May 19, 2016

(30) Foreign Application Priority Data
Dec. 26, 2013   (JP) ................................. 2013-268991

(51) Int. Cl.
*F16K 11/22*   (2006.01)
*F16K 27/00*   (2006.01)
(Continued)

(52) U.S. Cl.
CPC .............. *F16B 5/0642* (2013.01); *F16B 1/00* (2013.01); *F16K 27/00* (2013.01); *F16K 27/003* (2013.01); *F16B 2001/0035* (2013.01)

(58) Field of Classification Search
CPC ...... E05C 17/56; E05C 19/16; F15B 13/0817; Y10T 137/87885; Y10T 292/11
(Continued)

(56) References Cited

U.S. PATENT DOCUMENTS 2,742,250 A * 4/1956 Cronberger .............. A47G 1/17
24/303
3,324,521 A * 6/1967 Humiston ............... A41F 1/002
24/303
(Continued)

FOREIGN PATENT DOCUMENTS

JP     09-264306 A    10/1997
JP     3774800 B2      5/2006
(Continued)

OTHER PUBLICATIONS

International Search Report mailed Feb. 17, 2015, issued for PCT/JP2014/079955.

*Primary Examiner* — Seth W Mackay-Smith
(74) *Attorney, Agent, or Firm* — Locke Lord LLP

(57) ABSTRACT

To provide a lower member fixing device that eliminates the need for a fixation tool and reduces the time and effort for fixation, and a fluid control device provided with the lower member fixing device. A through hole of a lower member is formed by a large-diameter section opened in an upper surface and a small-diameter section continued from the lower part of the large-diameter section and opened in a lower surface. A fixation member includes a shaft section inserted into the small-diameter section of the through hole, a head inserted into the large-diameter section of the through hole, and a magnet section provided at a lower end of the shaft section. The support member is made of a magnetic substance and a recess into which the magnet section of the fixation member is fitted is formed in the upper surface of the support member.

8 Claims, 4 Drawing Sheets

(51) Int. Cl.
*F16B 5/06* (2006.01)
*F16B 1/00* (2006.01)

(58) Field of Classification Search
USPC ...................................................... 292/251.5
See application file for complete search history.

(56) References Cited

U.S. PATENT DOCUMENTS

| | | | | |
|---|---|---|---|---|
| 5,979,944 | A * | 11/1999 | Yokoyama | F15B 13/0817 |
| | | | | 285/124.3 |
| 7,199,296 | B2 * | 4/2007 | Scott | G10D 13/023 |
| | | | | 411/301 |
| 7,828,015 | B2 | 11/2010 | Albrecht et al. | |
| 8,052,549 | B2 * | 11/2011 | Sykora | A63B 59/20 |
| | | | | 473/513 |
| 9,400,006 | B1 * | 7/2016 | Huang | F16B 19/02 |
| 2010/0040410 | A1 * | 2/2010 | King | A47C 7/62 |
| | | | | 403/361 |
| 2014/0110936 | A1 | 4/2014 | Shinohara et al. | |

FOREIGN PATENT DOCUMENTS

| | | |
|---|---|---|
| JP | 2012-219870 A | 11/2012 |
| WO | 2006/100841 A1 | 9/2006 |
| WO | 2012/132788 A1 | 10/2012 |

\* cited by examiner

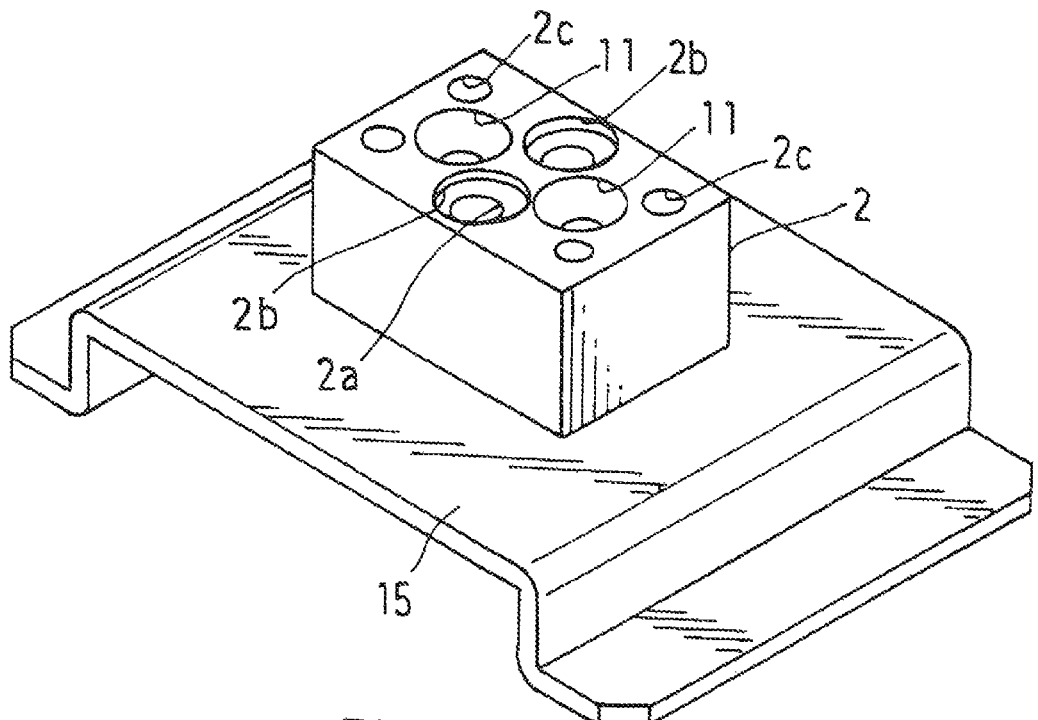
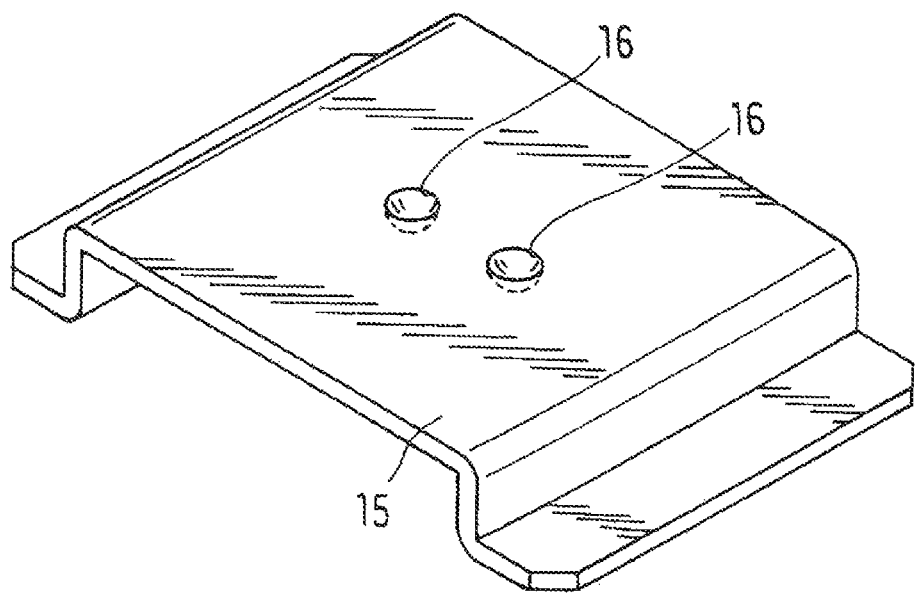

LOWER MEMBER FIXING DEVICE AND FLUID CONTROL DEVICE PROVIDED WITH THE SAME

TECHNICAL FIELD

The present invention relates to a fixing device for fixing, to a support member, block joints (lower members) disposed between the support member and fluid control units (upper members), the block joints being used in a fluid control device assembled by, for example, fixing the joints (block joints) on the support member and fixing the fluid control units so as to straddle the joint, and more particularly to a fluid control device provided with the fixing device.

BACKGROUND ART

PTL 1 discloses the devices illustrated in FIG. 5 as the lower member fixing device and fluid control device covered by the invention.

A fluid control device (1) is used in semiconductor equipment or the like and includes a plurality of block joints (lower members) (2) and (3) having fluid passages opened upward, a plurality of fluid control units (upper members) (4), (5), (6), and (7) having fluid passages opened downward and communicating with the fluid passages of the block joints (2) and (3), a plurality of sealing sections (not illustrated) provided on an abutting surface between the fluid passages of the block joints (2) and (3) and the fluid passages provided in the main bodies (4a), (5a), (6a), and (7a) of the fluid control units (4), (5), (6), and (7), a support member (51) for supporting the plurality of block joints (2) and (3), a plurality of joint member fixing bolts (52) for securing the block joints (2) and (3) to the support member (51), and a plurality of fluid control unit fixing bolts (8) for securing the fluid control units (4), (5), (6), and (7) to the block joints (2) and (3).

Each of the block joints (2) and (3) has a through hole (11) through which a bolt is inserted, a cylindrical spacer (12) is inserted into the through hole (11), and an annular elastic member (13) for biasing the block joints (2) and (3) downward (toward the support member (51)) is disposed on the lower surface of the flange of the spacer (12).

A lower member fixing device (9) fixes the block joints (2) and (3) (that is, lower members (2) and (3) with the through hole (11)) disposed between the support member (51) and the upper members (4), (5), (6), and (7) to the support member (51) and includes a screw hole (51a) provided in the support member (51), the bolt (52), the spacer (12), the elastic member (13), and the like.

CITATION LIST

Patent Literature

PTL 1: Japanese Patent No. 3774800

SUMMARY OF INVENTION

Technical Problem

The lower member fixing device disclosed in PTL 1 uses bolts (the joint fixing bolts (52)) for fixation, so a bolt tightening tool is necessary and the tightening of bolts is labor intensive.

An object of the invention is to provide a lower member fixing device that eliminates the need for a fixation tool and reduces the time and effort for fixation, and a fluid control device provided with the lower member fixing device.

Solution to Problem

A lower member fixing device according to the invention includes a through hole provided in a lower member, the through hole being formed by a large-diameter section opened in an upper surface and a small-diameter section continued from a lower part of the large-diameter section and opened in a lower surface and a fixation member including a shaft section inserted into the small-diameter section of the through hole, a head inserted into the large-diameter section of the through hole, and a magnet section provided at a lower end of the shaft section, in which the fixation member fixes the lower member having the through hole to a support member, the support member is made of a magnetic substance, and a magnetic force applied between the magnet section of the fixation member and the support member prevents the lower member from being separated from the support member.

The magnet section of the fixation member is fixed to the support member by a magnetic force, the lower member is prevented from moving upward by the head of the fixation member fixed to the support member, and the lower member is prevented from being separated from the support member. That is, the lower member can be fixed to the support member without using bolts. Accordingly, a fixing tool such as a wrench is not necessary, thereby reducing the time and effort for fixation.

Preferably, the shaft section and the head of the fixation member are formed integrally with each other. The lower end of the shaft section is fixed to the magnet section by, for example, press-fitting, but the fixation is not limited to press-fitting.

Preferably, a recess into which the magnet section of the fixation member is fitted is formed in the upper surface of the support member. In this structure, since a drag force for fitting can be obtained with respect to a force orthogonal to the axial direction of the fixation member, the lower member is fixed more firmly.

Preferably, the lower surface of the magnet section is, for example, hemispherical and the recess of the support member is also hemispherical accordingly. In this structure, the area of contact between the lower surface of the magnet section and the recess of the support member becomes larger, thereby further increasing the magnetic force.

The lower member fixing device may further have a cylindrical spacer to be inserted into the small-diameter section of the through hole. The lower member fixing device may further have an annular elastic member for biasing the lower member downward.

The cylindrical spacer and annular elastic member have been used conventionally and these components can be used to position (parallelize) the lower member easily.

The elastic member is deformed to enable the lower member to move upward and is preferably an annular body made of rubber or synthetic resin. The elastic member facilitates leveling work for making the upper surfaces of the lower members flush with each other. In addition, the elastic member can absorb vibrations by being elastically deformed.

The spacer may have no flange (may be cylindrical) or may have a flange at the upper end. When the spacer has not flange, the elastic body is disposed between the lower surface of the head and the step (the step between the large-diameter section and the small-diameter section) of the fixation member. When the spacer has a flange, the elastic body is disposed between the lower surface of the flange of the spacer and the step. The latter structure is more preferable.

Preferably, the diameter of the magnet section is larger than the diameter of the small-diameter section of the through hole, the head and the shaft section are cylindrical, and at least one slit for enabling reduction in an outer diameter of the head is provided in the head and the shaft section.

That is, although the diameter of the magnet section may be smaller than the diameter of the small-diameter section of the through hole so that the fixation member can be inserted into the through hole from above the lower member, preferably the diameter of the magnet section is larger than the diameter of the small-diameter section of the through hole so that the fixation member can be inserted into the through hole from below the lower member. In this structure, the fixation member is prevented from being disconnected upward from the lower member and the diameter of the magnet section can be increased without being restricted by the diameter of the small-diameter section of through hole, so a magnetic force with a necessary magnitude can be obtained easily.

In this case, the head needs to be inserted into the small-diameter section of the through hole. For this purpose, the head and the shaft section are cylindrical and at least one slit is provided in the head and the shaft section. A plurality of slits are preferably provided in the circumferential direction so as to extend from the upper surface of the head to the vicinity of the lower end of the shaft section.

A fluid control device according to the invention includes a plurality of block joints provided with fluid passages opened upward, a plurality of fluid control units provided with fluid passages opened downward, the fluid passages communicating with the fluid passages of the block joints, a plurality of sealing sections provided on an abutting surface between the fluid passages of the block joints and the fluid passages of the fluid control units, the support member supporting the plurality of block joints, and a plurality of bolts for securing the fluid control units to the block joints, in which the block joints are the lower members and the lower members are secured to the support member using any one of the lower member fixing devices described above.

All of the plurality of block joints may be secured to the support member by the above lower member fixing devices or a part of the plurality of block joint may be secured to the support member by the above lower member fixing devices. In the latter case, the others of the plurality of block joints are secured by the lower member fixing devices including, for example, bolts.

In this specification, the up and down indicate the up and down in FIG. 5, but this is for expediency and the fixing device and the fluid control device is installed on a horizontal plane in the state illustrated in the diagram, but may be installed on a vertical plane.

The fluid control device is typically installed on a vertical plane. In this case, the weights of the lower member and the fluid control unit supported by the lower member are supported by the force obtained by combining the magnetic force with the normal force acting on the magnetic section from the bottom of the recess. In this case, the weight supported by the magnetic force may be reduced by providing a convex portion for supporting the weight of the fluid control unit on the support member. Alternatively, a conventional fixation structure that uses bolts may be adopted in a part of the fixing device.

Advantageous Effects of Invention

In the lower member fixing device according to the invention, the magnet section of the fixation member is fixed to the support member by the magnetic force, the lower member is prevented from moving upward by the head of the fixation member fixed to the support member, and the lower member is prevented from being separated from the support member. That is, the lower member can be fixed to the support member without using bolts. Accordingly, a fixing tool such as a wrench is not necessary, thereby reducing the time and effort for fixation.

BRIEF DESCRIPTION OF DRAWINGS

FIG. 2 is a perspective view illustrating a support member and a lower member.

FIG. 3 is a perspective view illustrating the support member.

Figure 1:
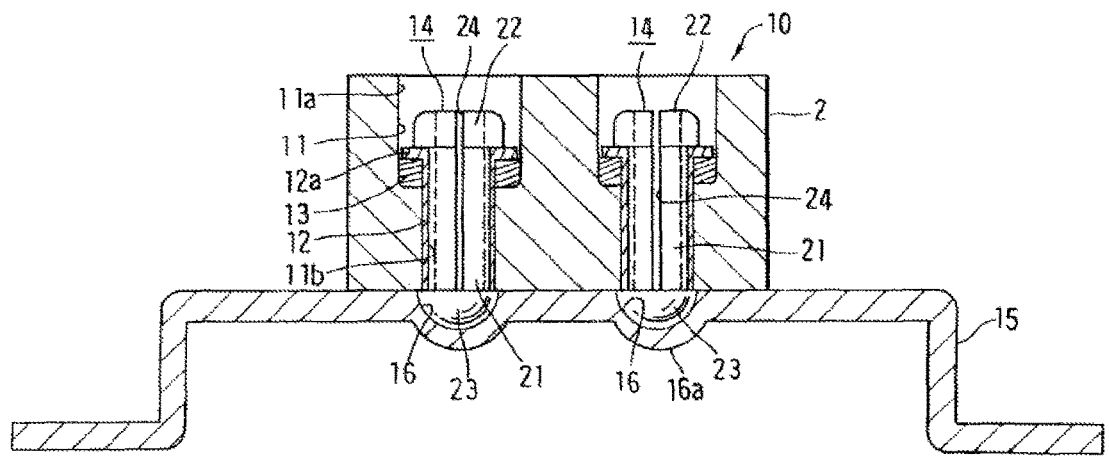
FIG. 1 is a cross sectional view illustrating a lower member fixing device according to an embodiment of the invention.

REFERENCE SIGNS LIST (2), (3): block joint (lower member)
(4), (5), (6), (7): fluid control unit (upper member)
(11): through hole
(11a): large-diameter section
(11b): small-diameter section
(12): spacer
(13): elastic member
(14): fixation member
(15): support member
(16): recess
(21): shaft section
(22): head
(23): magnet section
(24): slit

DESCRIPTION OF EMBODIMENTS

An embodiment of the invention will be described below with reference to the drawings. In the following description, the up and down indicate the up and down in FIG. 1.

FIGS. 1 to 4 illustrate a lower member fixing device according to an embodiment of the invention.

A lower member fixing device (10) fixes a lower member (2) to a support member (15) using a fixation member (14), in which bolts (52) in a fluid control device (1) illustrated in FIG. 5 have been replaced with fixation members (14), which will be described later. According to the change, a screw hole (51a) provided in a support member (51) is changed to a recess (16). A spacer (12) and an elastic member (13) are the same as those illustrated in FIG. 5.

Figure 5:
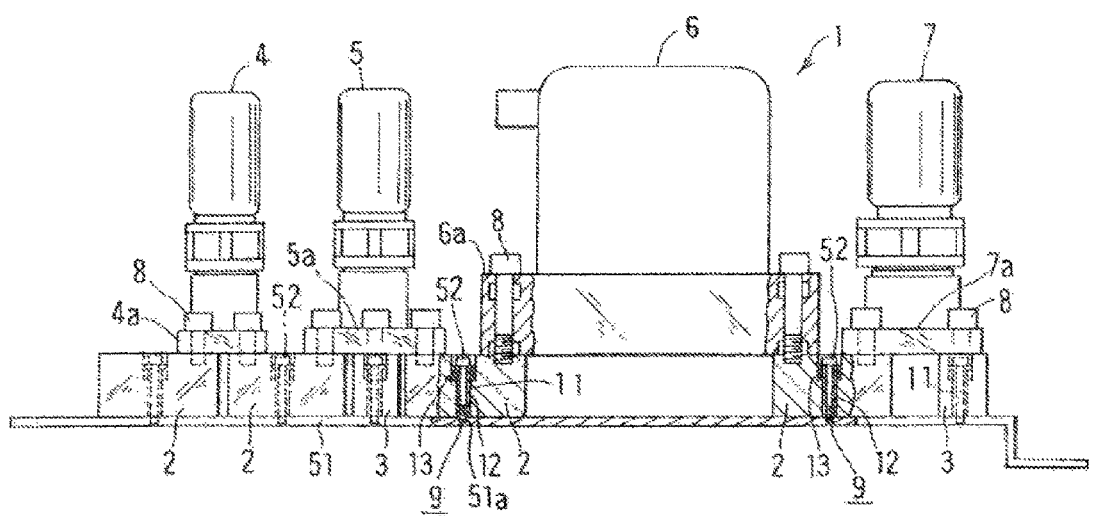
FIG. 5 is a side view illustrating a conventional lower member fixing device and a fluid control device provided with the lower member fixing device in which a part has been cut out.

The lower member (2) is the same as a block joint (2) in FIG. 5 and has the through holes (11) into which the bolts (52) are inserted. Each of the through holes (11) is formed by a large-diameter section (11a) opened in the upper surface and a small-diameter section (11b) continued from the lower part of the large-diameter section (11a) and opened in the lower surface.

As illustrated in FIG. 2, the lower member (block joint) (2) further includes V-shaped fluid passages (2a) having two openings opened upward, sealing section accommodating recesses (2b) provided in the edges of the openings of the fluid passages (2a), and female thread sections (2c) with which fluid control unit fixing bolts (reference numeral (8) in FIG. 5) are screwed. Note that the fluid passages (2a) are omitted in FIG. 1.

Figure 4:
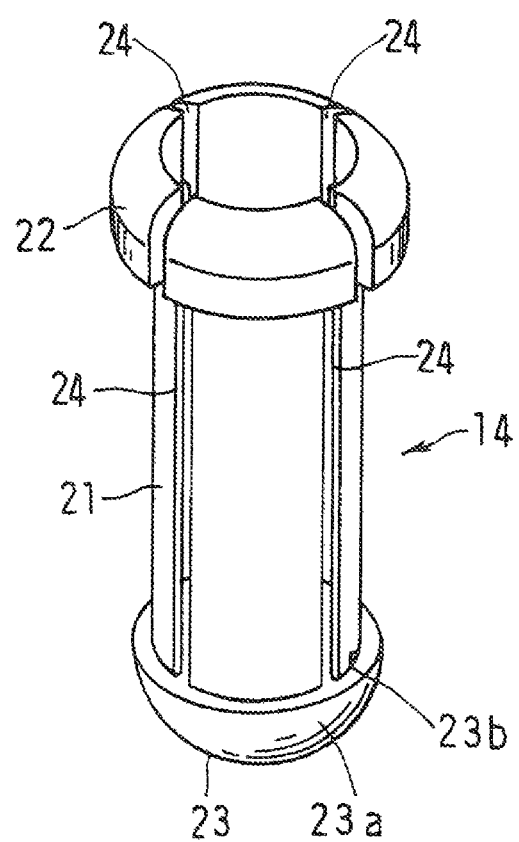
FIG. 4 is a perspective view illustrating a fixation member.

As illustrated in FIG. 4, the fixation member (14) includes a shaft section (21) to be inserted into the small-diameter section (11b) of the through hole (11), a head (22) to be inserted into the large-diameter section (11a) of the through hole (11), and a magnet section (23) provided at an end of the shaft section (21).

The magnet section (23) is hemispherical and includes a hemispherical outer periphery surface (23a) and a hemispherical inner periphery surface (23b).

The diameter of the magnet section (23) is larger than the diameter of the small-diameter section (11b) of the through hole (11) and, in the head (22) and the shaft section (21), four slits (24) extending in parallel with each other from the upper surface of the head (22) in the axial direction are provided at regular intervals in the circumferential direction. The slits (24) extend to the vicinity of the lower end of the shaft section (21), so that the outer diameter of the head (22) can be reduced by reducing the outer diameter of the shaft section (21).

The head (22) is formed integrally with the shaft section (21), the head (22) is relatively short and has a cylindrical shape with a larger diameter, and the shaft section (21) is relatively long and has a cylindrical shape with a smaller diameter. The lower end of the shaft section (21) is press-fitted and fixed to the inner periphery surface (23b) of the magnet section (23) to fix the shaft section (21) to the magnet section (23).

The head (22) and the shaft section (21) are made of proper metal such as steel. The head (22) and the shaft section (21) may be made of a magnetic substance or may not be made of a magnetic substance. The shaft section (21) may be fixed to the magnet section (23) using a method other than press-fitting.

The support member (15) is formed by a coated steel plate with a thickness of approximately 2 mm, that is, made of a magnetic substance. The upper surface of the support member (15) is provided with the recess (16) into which the magnet section (23) of the fixation member (14) is fitted. The recess (16) has a hemispherical shape into which the outer periphery surface (23a) of the magnet section (23) is exactly fitted so as to correspond to the hemispherical outer periphery surface (23a) of the magnet section (23). The recess (16) is created by dowel machining, not by boring so that a bottom (16a) of the recess (16) projects downward from the lower surface of the support member (15).

The cylindrical spacer (12) with a flange (12a) is fitted into the small-diameter section (11b) of the through hole (11) so that its lower end is received by the support member (15) and its upper end receives the head (22) of the fixation member (14) in the large-diameter section (11a). The annular elastic member (13) for biasing the lower member (2) downward (toward the support member (15)) is provided between the lower surface of the flange (12a) of the spacer (12) and the bottom (the step between the large-diameter section (11a) and the small-diameter section (11b)) of the large-diameter section (11a) of the through hole (11).

Although the spacer (12) is a conventional one, the spacer (12) may be omitted or the elastic member (13) may be present between the lower surface of the head (22) of the fixation member (14) and the bottom of the large-diameter section (11a) of the through hole (11) without providing the flange (12a).

The elastic member (13) is an annular body made of rubber or synthetic resin. The elastic member (13) may be configured so as to undergo elastic bending deformation by providing notches in the upper and lower parts of its outer periphery surface.

In FIG. 1, since the fixation member (14) fixes the spacer (12) to the support member (15), the fixation member (14) and the spacer (12) cannot move with respect to the support member (15). The lower member (2) receives a downward force from the spacer (12) via the elastic member (13) and the lower surface abuts against the support member (15), so the lower member (2) cannot move. Since the elastic force of the elastic member (13) made of rubber is smaller than a force generated by the hand, the lower member (2) can be lifted upward by the hand by applying an upward force to the lower member (2) against the elastic force. Accordingly, when the upper surface of a certain lower member (2) is low, the fine tuning (that is, the leveling) of the position of the upper surface of the lower member (2) can be performed by moving the lower member (2) upward against the elastic force of the elastic member (13).

Since the diameter of the magnet section (23) is larger than the diameter of the small-diameter section (11b) of the through hole (11), the fixation member (14) cannot be inserted into the lower member (2) from above and the fixation member (14) is inserted into the lower member (2) from below. Since the diameter of the head (22) is larger than the diameter of the small-diameter section (11b) of the through hole (11), the head (22) cannot be inserted into the through hole (11) as is. However, since the slits (24) are provided, the diameter of the head (22) can be reduced by reducing the diameter of the shaft section (21) so as to reduce the width of the slits (24). Since the width of the slits (24) are provided so that the head (22) can be inserted into the small-diameter section (11b) of the through hole (11), the fixation member (14) can be inserted into the through hole (11) from below by reducing the diameter of the head (22). Since the diameter of the magnet section (23) is larger than the diameter of the small-diameter section (11b) of the through hole (11), the magnet section (23) abuts against the lower end edge of the opening of the small-diameter section (11b) and the fixation member (14) cannot further move. In this case, since the head (22) widens to the original size in the large-diameter section (11a), the fixation member (14) is inserted into the through hole (11) in a state in which the fixation member (14) is not disconnected downward or upward.

When the lower member (2) to which the fixation member (14) having been attached as described above is attached to the support member (15) with the magnet section (23) of the fixation member (14) aligned with the recess (16) of the support member (15), the magnetic force applied between the magnet section (23) of the fixation member (14) and the support member (15) prevents the lower member (2) from being separated from the support member (15).

Here, the diameter of the magnet section (23) can be increased without being restricted by the diameter of the through hole (11) and the magnetic force with a necessary magnitude can be obtained easily.

In the lower member fixing device (10) according to the embodiment, the lower member (2) can be fixed to the support member (15) without using bolts. Inserting of the fixation member (14) into the through hole (11) does not need a fixing tool such as a wrench and the time and effort for fixation can be significantly reduced as compared with a conventional lower member fixing device that uses bolts for fixation.

The lower member fixing device (10) according to the invention illustrated in FIGS. 1 to 4 may be of course used to fix all of the block joints (2) and (3) of the fluid control device (1) illustrated in FIG. 5. However, a part of the block joints (2) and (3) may be fixed by a conventional lower member fixing device using the bolts (52) while the others of the block joints (2) and (3) are fixed by the lower member fixing device (10) according to the invention.

INDUSTRIAL APPLICABILITY

Since a fixation tool is not necessary and the time and effort for fixation can be reduced to fix the lower member, the lower member fixing device according to the invention can be applied to a fluid control device used in, for example, semiconductor equipment or the like to rationalize the fluid control device.

The invention claimed is:

1. A lower member fixing device, comprising:
a through hole provided in a lower member, the through hole being formed by a large-diameter section opened in an upper surface and a small-diameter section continued from a lower part of the large-diameter section and opened in a lower surface; and
a fixation member including a shaft section inserted into the small-diameter section of the through hole, a head inserted into the large-diameter section of the through hole, and a magnet section provided at a lower end of the shaft section,
wherein the fixation member fixes the lower member having the through hole to a support member,
a diameter of the magnet section is larger than a diameter of the small-diameter section of the through hole,
at least one slit for enabling reduction in an outer diameter of the head is provided in the head and the shaft section,
the support member is made of a magnetic substance, and
a magnetic force applied between the magnet section of the fixation member and the support member prevents the lower member from being separated from the support member.

2. A fluid control device comprising:
a plurality of block joints provided with fluid passages opened upward;
a plurality of fluid control units provided with fluid passages opened downward, the fluid passages communicating with the fluid passages of the block joints;
a plurality of sealing sections provided on an abutting surface between the fluid passages of the block joints and the fluid passages of the fluid control units;
a plurality of bolts for securing the fluid control units to the block joints, and
a lower member fixing device according to claim 1,
wherein the block joints are the lower members and the lower members are secured to the support member using the lower member fixing device.

3. The lower member fixing device according to claim 1, wherein a recess into which the magnet section of the fixation member is fitted is formed in an upper surface of the support member.

4. A fluid control device comprising:
a plurality of block joints provided with fluid passages opened upward;
a plurality of fluid control units provided with fluid passages opened downward, the fluid passages communicating with the fluid passages of the block joints;
a plurality of sealing sections provided on an abutting surface between the fluid passages of the block joints and the fluid passages of the fluid control units;
a plurality of bolts for securing the fluid control units to the block joints, and
a lower member fixing device according to claim 3,
wherein the block joints are the lower members and the lower members are secured to the support member using the lower member fixing device.

5. The lower member fixing device according to claim 1, wherein a lower surface of the magnet section is hemispherical and the recess of the support member is hemispherical.

6. A fluid control device comprising:
a plurality of block joints provided with fluid passages opened upward;
a plurality of fluid control units provided with fluid passages opened downward, the fluid passages communicating with the fluid passages of the block joints;
a plurality of sealing sections provided on an abutting surface between the fluid passages of the block joints and the fluid passages of the fluid control units;
a plurality of bolts for securing the fluid control units to the block joints, and
a lower member fixing device according to claim 5,
wherein the block joints are the lower members and the lower members are secured to the support member using the lower member fixing device.

7. The lower member fixing device according to claim 1, wherein
the head and the shaft section are cylindrical.

8. A fluid control device comprising:
a plurality of block joints provided with fluid passages opened upward;
a plurality of fluid control units provided with fluid passages opened downward, the fluid passages communicating with the fluid passages of the block joints;
a plurality of sealing sections provided on an abutting surface between the fluid passages of the block joints and the fluid passages of the fluid control units;
a plurality of bolts for securing the fluid control units to the block joints, and
a lower member fixing device according to claim 7,
wherein the block joints are the lower members and the lower members are secured to the support member using the lower member fixing device.

* * * * *